United States Patent
Tomita et al.

(10) Patent No.: US 11,746,503 B1
(45) Date of Patent: Sep. 5, 2023

(54) WORK VEHICLE, CONTROL DEVICE FOR WORK VEHICLE, AND STATE DETERMINATION METHOD FOR WORK VEHICLE

(71) Applicant: KUBOTA CORPORATION, Osaka (JP)

(72) Inventors: Jun Tomita, Sakai (JP); Tsutomu Aizawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/169,220

(22) Filed: Feb. 15, 2023

(30) Foreign Application Priority Data

Mar. 23, 2022 (JP) ................................. 2022-047150

(51) Int. Cl.
*E02F 9/26* (2006.01)
*F02D 41/00* (2006.01)
*G07C 5/08* (2006.01)

(52) U.S. Cl.
CPC ............ *E02F 9/26* (2013.01); *F02D 41/0097* (2013.01); *G07C 5/08* (2013.01); *B60Y 2200/41* (2013.01)

(58) Field of Classification Search
CPC ..... B60Y 2200/41–417; B60Y 2300/45; E02F 9/26; F02D 41/0097; G07C 5/02; G07C 5/08
See application file for complete search history.

(56) References Cited

FOREIGN PATENT DOCUMENTS

| JP | S62225727 A | * 12/1996 |
| JP | 2855526 B2 | * 2/1999 |
| JP | 2017-122405 | 7/2017 |

OTHER PUBLICATIONS

Tsuzuki, JP 2855526, supplemental partial machine translation. (Year: 1999).*
Yuki, JP 2017122405, machine translation. (Year: 2017).*

* cited by examiner

*Primary Examiner* — Hung Q Nguyen
*Assistant Examiner* — Mark L. Greene
(74) *Attorney, Agent, or Firm* — MORI & WARD, LLP

(57) ABSTRACT

A state determination method for a work vehicle includes detecting a rotation speed of an engine of the work vehicle during a first predetermined time period. A maximum rotation speed and a minimum rotation speed during the first predetermined time period are obtained. A parameter representing a fuel injection amount of the engine during the first predetermined time period is obtained. A variation amount that is a difference between a maximum value of the parameter during the first predetermined time period and a minimum value of the parameter during the first predetermined time period is obtained. It is determined that the work vehicle is in an operating state when a difference between the maximum rotation speed and the minimum rotation speed exceeds a rotation speed threshold value, or the variation amount exceeds a variation amount threshold value.

20 Claims, 4 Drawing Sheets

WORK VEHICLE, CONTROL DEVICE FOR WORK VEHICLE, AND STATE DETERMINATION METHOD FOR WORK VEHICLE

CROSS-REFERENCE TO RELATED APPLICATIONS

The present application claims priority under 35 U. S. C. § 119 to Japanese Patent Application No. 2022-047150, filed Mar. 23, 2022. The contents of this application are incorporated herein by reference in their entirety.

BACKGROUND OF THE INVENTION

Field of the Invention

The present invention relates to a work vehicle, a control device for a work vehicle, and a state determination method for a work vehicle.

Discussion of the Background

Japanese Patent Application Laid-Open No. 2017-122405 discloses a work machine that determines a traveling state of a work vehicle, a warm-up state, and whether or not a work implement is in operation. The work machine detects whether or not it is in a traveling state by detecting operation of a parking brake, determines that the work implement is in operation by detecting operation of a lock lever of the work implement, and determines a warm-up state based on cooling water and exhaust gas temperature.

SUMMARY OF THE INVENTION

According to one aspect of the present disclosure, a state determination method of a work vehicle includes detecting a rotation speed of an engine of the work vehicle during a first predetermined time period. The method further includes determining a maximum rotation speed that is a maximum value of the rotation speed during the first predetermined time period. The method further includes determining a minimum rotation speed that is a minimum value of the rotation speed during the first predetermined time period. The method further includes obtaining a parameter representing a fuel injection amount of the engine in the first predetermined time period. The method further includes obtaining a variation amount that is a difference between a maximum value of the parameter during the first predetermined time period and a minimum value of the parameter in the first predetermined time period. The method further includes determining that the work vehicle is in an operating state when the difference between the maximum rotation speed and the minimum rotation speed exceeds a rotation speed threshold value or the variation amount exceeds a variation amount threshold value.

According to another aspect of the present disclosure, a work vehicle includes an engine, a rotation sensor configured to detect a rotation speed of the engine, an injection amount detection sensor configured to detect a fuel injection amount of the engine, circuitry configured to determine a state of the work vehicle based on the rotation speed, and an operation member configured to input a rotation command value of the engine. The circuitry is configured to acquire a rotation speed of the engine from the rotation sensor during a first predetermined time period, determine a maximum rotation speed that is a maximum value of the rotation speed during the first predetermined time period and a minimum rotation speed that is a minimum value of the rotation speed during the first predetermined time period, acquire the fuel injection amount of the engine from the injection amount detection sensor during the first predetermined time period, calculate a variation amount that is a difference between a maximum value and a minimum value of a parameter representing the fuel injection amount during the first predetermined time period, and determine that the work vehicle is in the operating state when a difference between the maximum rotation speed and the minimum rotation speed exceeds a rotation speed threshold value or the variation amount exceeds a variation amount threshold value.

According to further aspect of the present disclosure, a control device for a work vehicle includes first circuitry configured to acquire a rotation speed of an engine of the work vehicle during a first predetermined time period. The control device further includes second circuitry configured to determine a maximum rotation speed that is a maximum value of the rotation speed during the first predetermined time period. The control device further includes third circuitry configured to determine a minimum rotation speed that is a minimum value of the rotation speed during the first predetermined time period. The control device further includes fourth circuitry configured to obtain a parameter representing a fuel injection amount of the engine during the first predetermined time period. The control device further includes fifth circuitry configured to obtain a variation amount that is a difference between the maximum value of the parameter during the first predetermined time period and the minimum value of the parameter during the first predetermined time period. The control device further includes sixth circuitry configured to determine that the work vehicle is in an operating state when a difference between the maximum rotation speed and the minimum rotation speed exceeds the rotation speed threshold value, or the variation amount exceeds the variation amount threshold value.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DETAILED DESCRIPTION OF THE INVENTION

Figure 1:
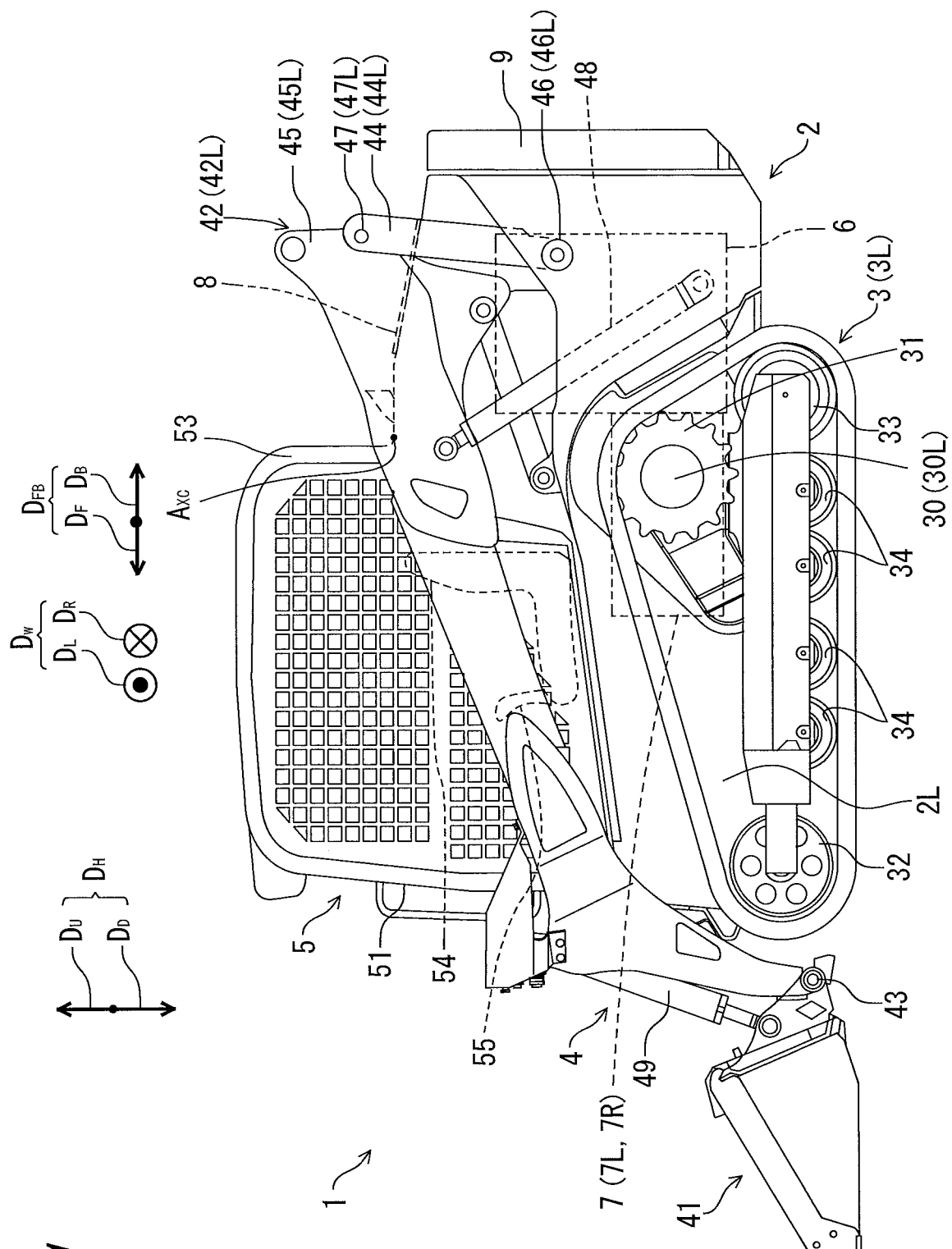
FIG. 1 is a side view of a work vehicle.

Hereinafter, embodiments of the present invention will be described with reference to the accompanying drawings. Like reference numerals indicate corresponding or identical features throughout the several views.

Embodiment

Figure 2:
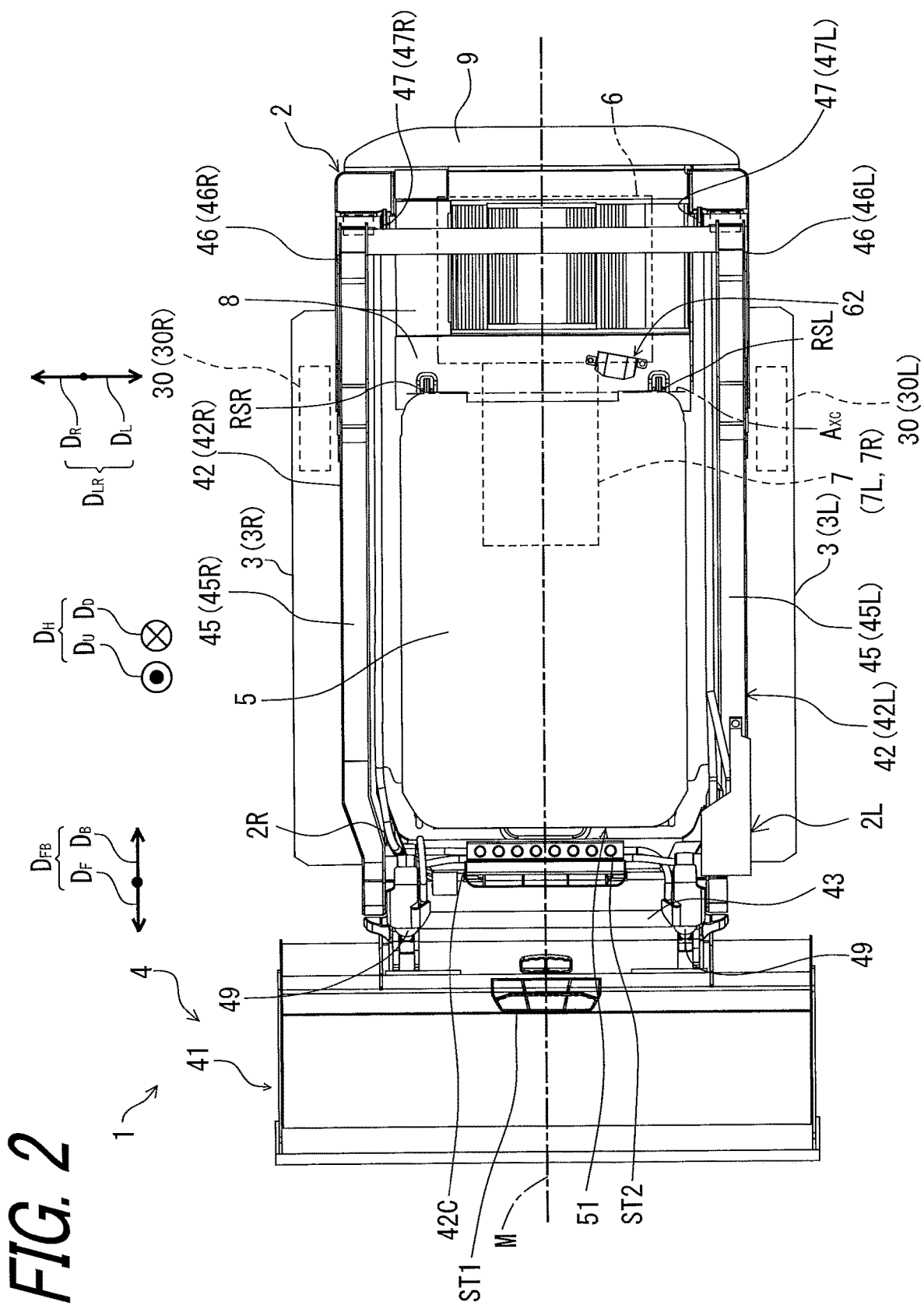
FIG. 2 is a top view of the work vehicle.

<Overall Configuration>
Referring to FIGS. 1 and 2, a work vehicle 1, such as a compact truck loader, includes a vehicle body 2, a pair of traveling devices 3, and a work device 4. The vehicle body 2 supports the traveling device 3 and the work device 4. In the illustrated embodiment, the traveling device 3 is a track-type traveling device 3. Therefore, each of the pair of traveling devices 3 includes a drive wheel 31, driven wheels 32 and 33, and a rolling wheel 34 which are driven by the hydraulic motor device 30. However, each of the pair of traveling devices 3 is not limited to the crawler type traveling device 3. Each of the pair of traveling devices 3 may be, for example, a front-wheel/rear-wheel traveling device 3, or may be a traveling device 3 wheel and a rear crawler. The work device 4 comprises a work equipment (bucket) 41 at a distal end of the work device 4. A proximal end of the work device 4 is attached to a rear portion of the vehicle body 2. The work device 4 includes a pair of arm assemblies 42 for rotatably supporting the bucket 41 via a bucket pivot shaft 43. Each of the pair of arm assemblies 42 includes a link 44 and an arm 45.

The link 44 includes a fulcrum shaft 46 is rotatable with respect to the vehicle body 2. The arm is rotatable around the joint shaft 47 relative to the link 44. The work device 4 further comprises a plurality of arm cylinders 48 and at least one equipment cylinder 49. Each of the plurality of arm cylinders 48 is rotatably connected to the vehicle body 2 and the arm 45, and moves the link 44, the arm 45, and the like to raise and lower the bucket 41. The at least one tool cylinder 49 is configured to tilt the bucket 41. The vehicle body 2 includes a cabin 5. The cabin 5 includes a front window 51 which can be opened and closed, and its outer shape is defined by a cab frame 53. The front window 51 may be omitted. The work vehicle 1 includes a driver's seat 54 and an operation lever 55 in the cabin 5. The cab frame 53 is rotatable about rotational shafts RSL and RSR on the vehicle body 2 as shown in FIG. 2. FIGS. 1 and 2 illustrates a common pivot AXC defined by the rotational shafts RSL and RSR. That is, the cab frame 53 is attached to the vehicle body 2 so as to be rotatable around the pivot AXC.

Note that in the embodiment according to the present application, the front-back direction $D_{FB}$ (forward direction DF/backward direction DB) means a front-back direction (forward direction/backward direction) as viewed from an operator seated on the driver's seat 54 of the cabin 5. A leftward direction DL, a rightward direction DR, a width direction $D_W$ means the left direction, the right direction, and the left-right direction as viewed from the operator, respectively. An upward direction Du, a downward direction DD, height direction DH means an upward direction, a downward direction, and a height direction as viewed from the operator. The front-back, left-right (width), and up-down (height) directions of the work vehicle 1 coincide with the front-back, left-right (width), and up-down (height) directions as viewed from the operator, respectively.

FIG. 1 shows the left side of the work vehicle 1. As shown in FIG. 2, the vehicle body 2 is substantially plane-symmetric with respect to a vehicle body center plane M, and has a first side surface 2L which is a left side surface and a second side surface 2R which is a right side surface. Among the pair of traveling devices 3, the traveling device 3 provided on the first side surface 2L is shown as a first traveling device 3L, and the traveling device 3 provided on the second side surface 2R is shown as a second traveling device 3R. Among the pair of arm assemblies 42, the arm assembly 42 provided on the left side with respect to a vehicle body center plane M is shown as the first arm assembly 42L, and the arm assembly 42 provided on the right side with respect to the vehicle body center plane M is shown as the second arm assembly 42R. The link 44 provided on the left side with respect to the vehicle body center plane M is shown as a first link 44L. The arm 45 provided on the left side with respect to the vehicle body center plane M is shown as a first arm 45L, and the arm 45 provided on the right side with respect to the vehicle body center plane M is shown as a second arm 45R. The fulcrum shaft 46 provided on the left side with respect to the vehicle body center plane M is shown as the first fulcrum shaft 46L, and the fulcrum shaft 46 provided on the right side with respect to the vehicle body center plane M is shown as the second fulcrum shaft 46R. The joint shaft 47 provided on the left side with respect to the vehicle body center plane M is shown as a first joint shaft 47L, and the joint shaft 47 provided on the right side with respect to the vehicle body center plane M is shown as a second joint shaft 47R. Among the hydraulic motor devices 30, the hydraulic motor device 30 provided on the left side with respect to the vehicle body center plane M is a first hydraulic motor device 30L, and the hydraulic motor device 30 provided on the right side with respect to the vehicle body center plane M is shown as a second hydraulic motor device 30R.

Referring to FIGS. 1 and 2, a work vehicle 1 includes an engine 6 provided at a rear portion of a vehicle body 2 and the plurality of first hydraulic pumps 7 including a first hydraulic pump 7L and a second hydraulic pump 7R. The engine 6 drives a plurality of hydraulic pumps 7. The first hydraulic pump 7L and the second hydraulic pump 7R are configured to discharge hydraulic fluid in order to drive the hydraulic motor device 30 that drives the drive wheels 31. The plurality of hydraulic pumps 7 other than the first hydraulic pump 7L and the second hydraulic pump 7R are configured to discharge hydraulic fluid in order to drive hydraulic actuators (a plurality of arm cylinders 48, at least one tool cylinder 49, and the like) connected to the work device 4. The engine 6 is provided between the pair of arm assemblies 42 in the width direction $D_W$ of the work vehicle 1. The work vehicle 1 further includes a cover 8 for covering an engine 6. The work vehicle 1 further includes a bonnet cover 9 provided at the rear end of the vehicle body 2. The bonnet cover 9 can be opened and closed such that a maintenance person can perform maintenance work of the engine 6 and the like.

<State Determination System>

Figure 3:
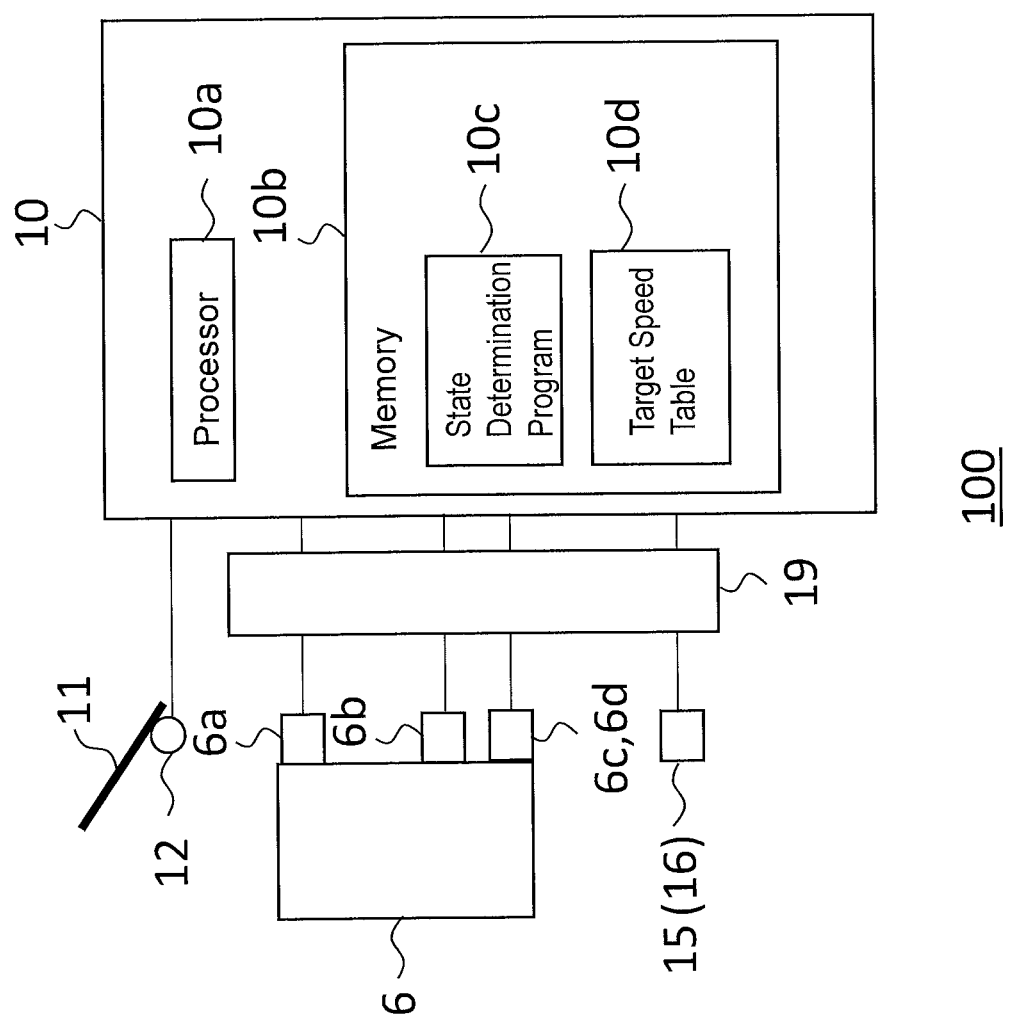
FIG. 3 is a block diagram of the work vehicle.

The work vehicle 1 includes a state determination system 100. FIG. 3 is a schematic configuration diagram of the state determination system 100 of the work vehicle 1. The state determination system 100 includes a controller 10, an operation member 11, a sensor 12, a rotation sensor 6a, an injection amount detection sensor 6b, an exhaust gas temperature detection sensor 6c, a water temperature detection sensor 6d, a speed detection sensor 15, and a network 19. The controller 10 is, for example, an electronic circuit (circuitry) such as an electric control unit (ECU). The controller 10 includes a hardware processor 10a and a memory 10b. The memory 10b includes a volatile memory and a nonvolatile memory. The memory 10b includes a state determination program 10c for realizing state determination described later, and a target speed table 10d. The processor 10a executes the state determination while executing the state determination program 10c. In the following embodiments, the controller 10 may be referred to as a control device.

The operation member 11 is a member for setting a target rotation speed of the engine 6. In other words, the operation member 11 is a member for inputting a rotation command value of the engine 6. The operation member 11 is an accelerator pedal which is a speed input device different from the above-described operation lever 55 or an accelerator lever which is swingably supported. The operation member 11 is provided with a sensor 12. The operation amount detected by the sensor 12 is input to the controller 10. The engine rotation speed corresponding to the operation amount detected by the sensor 12 is the target rotation speed of the engine 6. The target speed table 10d stores a target rotation speed of the engine 6 corresponding to the operation amount detected by the sensor 12. In other words, the controller 10 refers to the target speed table 10d and sets the target rotation speed of the engine 6 based on the operation amount of the operation member 11.

The controller 10 outputs a rotation command indicating, for example, a fuel injection amount, an injection timing, and a fuel injection rate to the injector so that the determined target rotation speed of the engine 6 is achieved. Alternatively, the controller 10 outputs a rotation command indicating a fuel injection pressure or the like to the supply pump or the common rail so that the determined target rotation speed of the engine 6 is achieved. A rotation sensor 6a that detects an actual engine rotation speed (referred to as an actual rotation speed of the engine 6) is connected to the controller 10, and the actual rotation speed of the engine 6 is input to the controller 10. The rotation sensor 6a is, for example, a potentiometer configured to detect a rotation speed of a rotating member connected to a crankshaft of the engine 6. When a load is applied to the engine 6, the actual rotation speed of the engine 6 decreases from the target rotation speed of the engine 6. A decrease in the actual rotation speed from the target rotation speed when a load is applied to the engine 6 is referred to as a drop of the engine 6.

The injection amount detection sensor 6b is configured to detect a fuel injection amount of the engine 6. An injection amount detection sensor 6b is connected to the controller 10, and the controller 10 is configured to acquire a parameter representing a fuel injection amount of the engine 6 from the injection amount detection sensor 6b. This parameter may be a value of the fuel injection amount itself, or may be an engine load factor obtained by dividing the fuel injection amount of the engine 6 detected by the injection amount detection sensor 6b by the maximum value of the fuel injection amount of the engine 6 corresponding to the rotation speed of the engine 6. The maximum value of the fuel injection amount of the engine 6 corresponding to the rotation speed of the engine 6 is a value determined in advance from the specifications (horsepower or the like) of the engine 6, and is stored in the memory 10b, for example. The engine load factor may be expressed as a value of 0 to 1, or may be expressed as a value of 0 to 100%. The controller 10 determines the state of the work vehicle 1 based on the rotation speed of the engine 6.

The exhaust gas temperature detection sensor 6c detects the temperature of the exhaust gas from the engine 6. The water temperature detection sensor 6d is a temperature sensor which detects the temperature of the coolant of the engine 6. The detection values of the exhaust gas temperature detection sensor 6c and the water temperature detection sensor 6d are not directly used for the state determination, but are not directly used for the state determination. It is used to analyze the state of the engine 6 and the like together with the result of state determination of the work vehicle 1 described later. The speed detection sensor 15 includes a position sensor 16 of the work vehicle 1 such as a GPS (Global Positioning System). The position sensor 16 detects position information of the work vehicle 1. The position information is, for example, the latitude and longitude of the work vehicle 1. However, the position information may be in another format (for example, information indicating a direction and a distance from a reference position) as long as it is information for specifying the position of the work vehicle 1. The moving speed of the work vehicle 1 is calculated based on the moving distance per unit time detected by the position sensor SP. The network 19 connects the rotation sensor 6a, the exhaust gas temperature detection sensor 6c, the water temperature detection sensor 6d, and the speed detection sensor 15 (position sensor 16) to the controller 10. The network 19 is preferably a controller area network (CAN). That is, the rotation speed and the position information of the engine 6 are communicated by the controller area network.

<State Determination Method of Work Vehicle>

Figure 4:
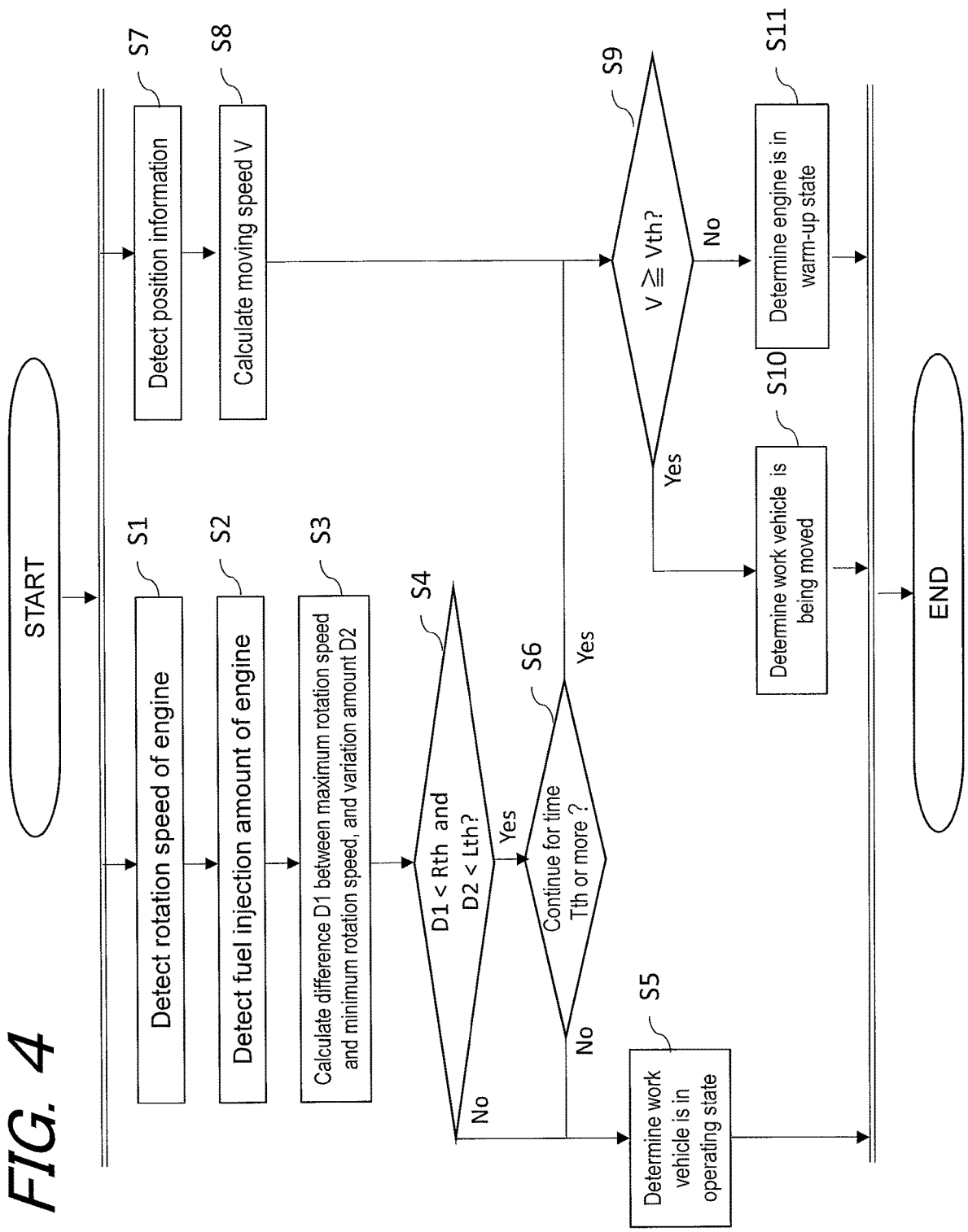
FIG. 4 is a flowchart illustrating an operation of a state determination method of the work vehicle.

Next, a state determination method of the work vehicle 1 according to the present embodiment will be described. The state determination method is realized by, for example, the processor 10a executing the state determination program 10c. FIG. 4 is a flowchart illustrating an operation of a state determination method of the work vehicle 1. As Step S1, the state determination method includes a process of detecting the rotation speed of the engine 6 of the work vehicle 1 in a period (a first predetermined time period) representing a predetermined time length. To be more specific, in step S1, the controller 10 (electronic circuit) of the work vehicle 1 acquires the rotation speed of the engine 6 from the rotation sensor 6a and the fuel injection amount of the engine 6 from the injection amount detection sensor 6b in a period representing a predetermined time length. This time length is arbitrary.

As the step S2, the state determination method includes a process of detecting the fuel injection amount of the engine 6 in the period representing the time length. To be more specific, in step S2, the controller 10 (the electronic circuit) of the work vehicle 1 acquires the rotation speed of the engine from the injection amount detection sensor 6b and the fuel injection amount of the engine 6 from the injection amount detection sensor 6b in the period representing the time length. Alternatively, the controller 10 (electronic circuit) may acquire the engine load factor as a parameter representing the fuel injection amount of the engine 6 in the period.

As step S3, the state determination method includes obtaining a maximum rotation speed which is a maximum value of the rotation speed of the engine 6 in the period and a minimum rotation speed which is a minimum value of the rotation speed of the engine 6 in the period, and calculating a difference D1 between the maximum rotation speed and the minimum rotation speed. Further, the state determination method includes obtaining a maximum value of the parameter in the period and a minimum value of the parameter in the period, and calculating a variation amount D2 of the parameter. Specifically, the state determination method includes obtaining a maximum load factor that is a maximum value of the engine load factor in the period and a minimum load factor that is a minimum value of the engine load factor in the period, and calculating the variation amount D2 that is a difference between the maximum load factor and the minimum load factor. Or the maximum value of the fuel injection amount of the engine 6 in the period and the minimum value which is the minimum value of the fuel injection amount of the engine 6 in the period may be obtained, and the variation amount D2 which is a difference between the maximum value and the minimum value may be calculated.

In step S3, the controller 10 (electronic circuit) obtains a maximum rotation speed that is a maximum value of the rotation speed of the engine 6 in the period and a minimum rotation speed that is a minimum value of the rotation speed of the engine 6 in the period, and calculates a difference D1 between the maximum rotation speed and the minimum rotation speed. Further, the controller 10 (electronic circuit) obtains a maximum value of the parameter in the period and a minimum value of the parameter in the period, and calculates a variation amount D2 of the parameter. For example, the controller 10 (electronic circuit) may obtain a maximum load factor that is a maximum value of the engine load factor in the period and a minimum load factor that is a minimum value of the engine load factor in the period, and calculate the variation amount D2 that is a difference between the maximum load factor and the minimum load factor, or may obtain a maximum value of the fuel injection amount of the engine 6 in the period and a minimum value that is a minimum value of the fuel injection amount of the engine 6 in the period, and calculate the variation amount D2 that is a difference between the maximum value and the minimum value.

In step S4, the controller 10 (the electronic circuit) determines whether or not the difference D1 is smaller than a predetermined rotation speed threshold value Rth and the variation amount D2 is smaller than a predetermined variation amount threshold value Lth. When the difference D1 is equal to or greater than the rotation speed threshold value Rth or the variation amount D2 is equal to or greater than the variation amount threshold value Lth (No in step S4), the controller 10 (electronic circuit) determines that the current state is the operating state (step S5). When the difference D1 is equal to or greater than the rotation speed threshold value Rth, it means that the load of the engine 6 drops due to a sudden change caused by the operator depressing the accelerator pedal or the like or a large change in the load of the engine 6 caused by a change in the running resistance or the load of the appliance. When the variation amount D2 is equal to or larger than the variation amount threshold value Lth, it means that the fuel injection amount is changed by controlling the fuel injection amount in order to maintain the rotation speed of the engine 6 at the target rotation speed even if there is a change in the running resistance or the load of the appliance. Therefore, it is possible to accurately detect the operating state under the condition of step S4. Since the change in the fuel injection amount can be detected regardless of the type of the engine 6 by using the engine load factor as a parameter, there is an advantage in that the same variation amount threshold value Lth can be applied to the work vehicle 1 on which different types of engines 6 are mounted. The operating state mentioned here includes a state in which the work vehicle 1 is propelling itself and a state in which the work vehicle 1 is performing work. The rotation speed threshold value Rth is empirically determined and is, for example, 12 rpm. The variation amount threshold value Lth is empirically determined and is, for example, 10%.

Therefore, in the state determination method, the difference D1 between the maximum rotation speed and the minimum rotation speed is greater than the rotation speed threshold value Rth or the variation amount D2 is greater than the variation amount threshold value Lth (No in step S4), it is determined that the work vehicle 1 is in the operating state (step S5). The state determination method includes determining that the work vehicle 1 is in the operating state (step S4) when the difference D1 between the maximum rotation speed and the minimum rotation speed is equal to the rotation speed threshold value Rth or the variation amount D2 is equal to the variation amount threshold value Lth (No in step S5). That is, when the difference D1 between the maximum rotation speed and the minimum rotation speed exceeds the rotation speed threshold value Rth or the variation amount D2 exceeds the variation amount threshold value Lth (No in step S4), the controller 10 (electronic circuit) determines that the work vehicle 1 is in the operating state (step S5). The controller 10 (the electronic circuit) determines that the work vehicle 1 is in the operating state when the difference D1 between the maximum rotation speed and the minimum rotation speed is equal to the rotation speed threshold value Rth or the variation amount D2 is equal to the variation amount threshold value Lth.

In Step S6, the controller 10 (the electronic circuit) determines whether or not the time for which the determination result is Yes in Step S4 has continued for a predetermined time (a second predetermined time period) Tth or more. When it has not continued for the predetermined time Tth or more (No in step S6), the controller 10 (the electronic circuit) executes step S5. In a case where the elapsed time is equal to or longer than the time Tth (Yes in Step S6), the controller 10 (electronic circuit) executes Step S9 described below.

As parallel processing with step S1, as step S7, the state determination method includes detecting position information of the work vehicle 1. To be specific, at step S7, the controller 10 (the electronic circuit) acquires position information from the position sensor 16. It is preferable that the position information is temporally synchronized with the rotation speed of the engine 6 detected in step S1. However, in a case where the position information is not synchronized with the rotation speed of the engine 6, it is preferable that the controller 10 (electronic circuit) estimates and calculates position information at times at both ends of the period in step S3 by linear interpolation or the like.

As step S8, the state determination method includes calculating the moving speed V of the work vehicle 1 based on the position information. To be specific, in step S8, the controller 10 (the electronic circuit) calculates the moving speed V of the work vehicle 1 based on the position information. To be more specific, the controller 10 (electronic circuit) obtains the movement distance in the period from the positional information of the two points at the time points at both ends of the period of step S3 obtained in step S7. When the two pieces of position information are latitude and longitude, the distance between the two points can be calculated by using a well-known method such as Hubeny's formula, spherical triangulation, or geodesic navigation. Then, the controller 10 (electronic circuit) calculates the moving speed V of the work vehicle 1 by dividing the obtained moving distance by the time length of the period.

When a state (a first state) in which a difference D1 between the maximum rotation speed and the minimum rotation speed does not exceed the rotation speed threshold value Rth and the variation amount D2 does not exceed the variation amount threshold value Lth continues for the predetermined time Tth or longer (Yes in step S6), in step S9, the controller 10 (electronic circuit) determines whether or not the moving speed V calculated in step S8 is equal to or higher than a predetermined speed threshold value Vth. The moving speed V is equal to or greater than a predetermined speed threshold value Vth (Yes in step S9), the controller 10 (electronic circuit) determines that the work vehicle 1 is being moved while the engine 6 remains in the driving state (step S10). The state where the engine 6 is in the driving state indicates a state where an ignition switch of the engine 6 is turned on. The state of being moved indicates a state in which the work vehicle 1 is transported on a truck or the like. In a cold district, when the hydraulic oil or the cooling water is completely frozen, it is difficult to start the work vehicle 1 thereafter. Therefore, the engine 6 is usually driven even during transportation of the work vehicle 1. In step S10, it is determined whether or not such a state exists. When the moving speed V is less than the predetermined speed threshold value Vth (No in step S9), the controller 10 (electronic circuit) determines that the engine 6 is in the warm-up state (step S11).

Therefore, in the determination method, when a state in which the difference D1 between the maximum rotation speed and the minimum rotation speed does not exceed the rotation speed threshold value Rth and the variation amount D2 is larger than the variation amount threshold value Lth continues for the predetermined time Tth or longer (Yes in step S6), and when the moving speed V exceeds the predetermined speed threshold value Vth (Yes in step S9), it is determined that the work vehicle 1 is being moved while the engine 6 is in the driving state (step S10). In the determination method, when a state in which the difference D1 does not exceed the rotation speed threshold value Rth and the variation amount D2 does not exceed the variation amount threshold value Lth continues for a predetermined time Tth or more, and (Yes in step S6), and when the moving speed V is equal to the predetermined speed threshold value Vth (Yes in Step S9), it is determined that the work vehicle 1 is being moved while the engine 6 is in the driving state (Step S10). The determination method further includes determining that the engine 6 is in the warm-up state (step S11) when the state in which the difference D1 does not exceed the rotation speed threshold value Rth and the variation amount D2 does not exceed the variation amount threshold value Lth continues for the predetermined time Tth or more (Yes in step S6) and the moving speed V is less than the predetermined speed threshold value Vth (No in step S9).

That is, when a state in which the difference D1 between the maximum rotation speed and the minimum rotation speed does not exceed the rotation speed threshold value Rth and the variation amount D2 does not exceed the variation amount threshold value Lth continues for the predetermined time Tth or longer (Yes in step S6), and the moving speed V exceeds the predetermined speed threshold value Vth (Yes in step S9), the controller 10 (electronic circuit) determines that the work vehicle 1 is moving while the engine 6 is in the driving state (step S10). When a state in which the difference D1 does not exceed the rotation speed threshold value Rth and the variation amount D2 does not exceed the variation amount threshold value Lth continues for the predetermined time Tth or longer (Yes at Step S6), and the moving speed V is equal to the predetermined speed threshold value Vth (Yes at Step S9), the controller 10 (electronic circuit) determines that the work vehicle 1 is moving while the engine 6 is in the driving state (step S10). The controller 10 (electronic circuit) determines that the engine 6 is in the warm-up state (step S11) when a state in which the difference D1 does not exceed the rotation speed threshold value Rth and the variation amount D2 does not exceed the variation amount threshold value Lth continues for the predetermined time Tth or more (Yes in step S6) and the moving speed V is less than the speed threshold value Vth (No in step S9). When the processing of steps S5, S10 and S11 is completed, the processing of steps S1 and S7 is repeated.

<Effects of Embodiment>

In the work vehicle 1, the controller 10 of the work vehicle 1, and the state determination method for the work vehicle 1 according to the present embodiment, whether or not the work vehicle 1 is in the operating state is determined based only on the rotation speed of the engine 6 and the variation amount of the parameter representing the fuel injection amount. When the determination is made by the operation of the operation tool by the operator as in Patent Document 1, if the operator removes the parking brake or the lock lever, the operating state is detected even if it is not actually the operating state. However, in the detection method as in the present embodiment, since the state is estimated from the internal parameters of the work vehicle 1, the operating state of the work vehicle 1 can be estimated with higher accuracy.

Further, by determining that the engine is in the warming-up state when the fluctuation range between the rotation speed and the fuel injection amount is small, it is possible to more accurately estimate whether or not the engine is in the warming-up state. In addition, by not using the exhaust gas temperature or the cooling water as a parameter for determining whether or not the engine is in the warm-up state, it is possible to accurately estimate whether or not the engine is in the warm-up state even if control for optimally controlling the exhaust gas temperature by changing the rotation speed of the cooling fan is added. Furthermore, it is possible to detect a state in which the engine 6 is driven even during transportation of the work vehicle 1, which is a usage mode in a cold district, by utilizing the small fluctuation range of the rotation speed and the fuel injection amount and the moving speed V. By detecting these states and detecting the exhaust gas temperature and the temperature of the cooling water in each state, the rotation speed of the cooling fan can be changed to perform control for optimally controlling the exhaust gas temperature with higher accuracy.

<Modification>

The presence or absence of an equal sign in each determination of steps S4, S6, and S9 in FIG. 4 may be opposite to that shown in the above embodiment. That is, in step S4, it may be determined whether D1≤Rth and D2≤Lth, it may be determined whether D1<Rth and D2≤Lth, or it may be determined whether D1≤Rth and D2<Lth. In step S5, it may be determined whether or not the elapsed time exceeds the time Tth. In step S9, it may be determined whether or not V>Vth.

As used herein, the term "comprising" and its derivatives are open-ended terms that specify the presence of elements but do not preclude the presence of other non-recited elements. This also applies to the terms "comprising", "including" and their derivatives.

The terms "member", "component", "body" and "structure" may have multiple meanings, such as a single part or multiple parts.

Ordinal numbers such as "first" and "second" are merely terms for identifying configurations and do not have any other meaning (e.g., a particular order). For example, "a first element" does not imply that "a second element" is present, and "a second element" does not imply that "a first element" is present.

Terms of degree such as "substantially," "about," and "approximately," unless specifically stated in an embodiment, can mean a reasonable amount of deviation such that the end result is not significantly changed. All numerical values set forth in this application can be interpreted to include words such as "substantially," "about," and "approximately."

In this application, the phrase "at least one of A and B" should be interpreted to include A alone, B alone, and both A and B.

Obviously, numerous modifications and variations of the present invention are possible in light of the above teachings. Accordingly, the present invention may be practiced otherwise than as specifically disclosed herein without departing from the scope of the present invention.

What is claimed is:

1. A state determination method for a work vehicle, comprising:
   detecting a rotation speed of an engine of the work vehicle during a first predetermined time period;
   determining a maximum rotation speed that is a maximum value of the rotation speed during the first predetermined time period;
   determining a minimum rotation speed that is a minimum value of the rotation speed during the first predetermined time period;
   obtaining a parameter representing a fuel injection amount of an engine during the first predetermined time period;
   obtaining a variation amount that is a difference between a maximum value of the parameter during the first predetermined time period and a minimum value of the parameter during the first predetermined time period; and
   determining that the work vehicle is in an operating state when a difference between the maximum rotation speed and the minimum rotation speed exceeds a rotation speed threshold value, or the variation amount exceeds a variation amount threshold value.

2. The state determination method according to claim 1, wherein
   the operating state includes a state in which the work vehicle is propelling itself and a state in which the work vehicle is performing work.

3. The state determination method according to claim 2, wherein
   the work vehicle is determined to be in the operating state when the difference between the maximum rotation speed and the minimum rotation speed is equal to the rotation speed threshold value or the variation amount is equal to the variation amount threshold value.

4. The state determination method according to claim 2, further comprising:
   detecting position information of the work vehicle;
   calculating a moving speed of the work vehicle based on the position information;
   determining whether a first state in which the difference between the maximum rotation speed and the minimum rotation speed does not exceed the rotation speed threshold value and the variation amount does not exceed the variation amount threshold value continues for a second predetermined time period or more;
   determining whether the moving speed exceeds a predetermined speed threshold value; and
   determining that the work vehicle is being moved while the engine is in a driving state when the first state continues for the second predetermined time period or more, and the moving speed exceeds the predetermined speed threshold value.

5. The state determination method according to claim 1, wherein
   the work vehicle is determined to be in the operating state when the difference between the maximum rotation speed and the minimum rotation speed is equal to the rotation speed threshold value, or the variation amount is equal to the variation amount threshold value.

6. The state determination method according to claim 5, further comprising:
   detecting position information of the work vehicle;
   calculating a moving speed of the work vehicle based on the position information;
   determining whether a first state in which the difference between the maximum rotation speed and the minimum rotation speed does not exceed the rotation speed threshold value and the variation amount does not exceed the variation amount threshold value continues for a second predetermined time period or more;
   determining whether the moving speed exceeds a predetermined speed threshold value; and
   determining that the work vehicle is being moved while the engine is in a driving state when the first state continues for the second predetermined time period or more, and the moving speed exceeds the predetermined speed threshold value.

7. The state determination method according to claim 1, further comprising:
   detecting position information of the work vehicle;
   calculating a moving speed of the work vehicle based on the position information;
   determining whether a first state in which the difference between the maximum rotation speed and the minimum rotation speed does not exceed the rotation speed threshold value and the variation amount does not exceed the variation amount threshold value continues for a second predetermined time period or more;
   determining whether the moving speed exceeds a predetermined speed threshold value; and
   determining that the work vehicle is being moved while the engine is in a driving state when the first state continues for the second predetermined time period or more, and the moving speed exceeds the predetermined speed threshold value.

8. The state determination method according to claim 7, further comprising:
   determining that the engine is in a warm-up state when the first state continues for the second predetermined time period or more, and the moving speed is less than the predetermined speed threshold value.

9. The state determination method according to claim 7, further comprising:
   determining that the work vehicle is being moved while the engine is in the driving state when the first state continues for the second predetermined time period or more, and the moving speed is equal to the predetermined speed threshold value.

10. The state determination method according to claim 1, wherein
    the parameter is an engine load factor obtained by dividing the fuel injection amount of the engine by a maximum value of the fuel injection amount of the engine corresponding to the rotation speed of the engine.

11. A work vehicle comprising:
    an engine;
    a rotation sensor configured to detect a rotation speed of the engine;
    an injection amount detection sensor configured to detect a fuel injection amount of the engine;
    circuitry configured to determine a state of the work vehicle based on the rotation speed;
    an operation member configured to input a rotation command value of the engine; and the circuitry being configured to:
  acquire a rotation speed of the engine from the rotation sensor during a first predetermined time period;
  determine a maximum rotation speed that is a maximum value of the rotation speed during the first predetermined time period;
  determine a minimum rotation speed that is a minimum value of the rotation speed during the first predetermined time period;
  acquire the fuel injection amount of the engine from the injection amount detection sensor during the first predetermined time period;
  calculate a variation amount that is a difference between a maximum value and a minimum value of a parameter representing the fuel injection amount during the first predetermined time period; and
  determine that the work vehicle is in an operating state when a difference between the maximum rotation speed and the minimum rotation speed exceeds a rotation speed threshold value, or the variation amount exceeds a variation amount threshold value.

12. The work vehicle according to claim 11, wherein the operating state includes a state in which the work vehicle is propelling itself and a state in which the work vehicle is performing work.

13. The work vehicle according to claim 11, wherein the circuitry is configured to determine that the work vehicle is in the operating state when the difference between the maximum rotation speed and the minimum rotation speed is equal to the rotation speed threshold value, or the variation is equal to the variation amount threshold value.

14. The work vehicle according to claim 11, further comprising:
  a position sensor to detect position information of the work vehicle,
  wherein the circuitry is configured to:
    calculate a moving speed of the work vehicle based on the position information,
    determine whether a first state in which the difference between the maximum rotation speed and the minimum rotation speed does not exceed the rotation speed threshold value and the variation amount does not exceed the variation amount threshold value continues for a second predetermined time period or more;
    determine whether the moving speed exceeds a predetermined speed threshold value; and
    determine that the work vehicle is being moved while the engine is in a driving state when the first state continues for the second predetermined time period or more, and the moving speed exceeds a predetermined speed threshold value.

15. The work vehicle according to claim 14, wherein the circuitry is configured to determine that the engine is in a warm-up state when the first state continues for the second predetermined time period or more, and the moving speed is less than the predetermined speed threshold value.

16. The work vehicle according to claim 14, wherein the circuitry is configured to determine that the work vehicle is being moved while the engine is in the driving state when the first state continues for the second predetermined time period or more and the moving speed is equal to the predetermined speed threshold value.

17. The work vehicle according to claim 11, wherein the parameter is an engine load factor obtained by dividing the fuel injection amount of the engine by a maximum value of the fuel injection amount of the engine corresponding to the rotation speed of the engine.

18. A control device for a work vehicle, comprising:
  first circuitry configured to acquire a rotation speed of an engine of the work vehicle during a first predetermined time period;
  second circuitry configured to determine a maximum rotation speed that is a maximum value of the rotation speed during the first predetermined time period;
  third circuitry configured to determine a minimum rotation speed that is a minimum value of the rotation speed during the first predetermined time period;
  fourth circuitry configured to obtain a parameter representing a fuel injection amount of the engine during the first predetermined time period;
  fifth circuitry configured to obtain a variation amount that is a difference between a maximum value of the parameter during the first predetermined time period and a minimum value of the parameter during the first predetermined time period; and
  sixth circuitry configured to determine that the work vehicle is in an operating state when a difference between the maximum rotation speed and the minimum rotation speed exceeds a rotation speed threshold value, or the variation amount exceeds a variation amount threshold value.

19. The control device according to claim 18, wherein the operating state includes a state in which the work vehicle is propelling itself and a state in which the work vehicle is performing work.

20. The control device according to claim 18, wherein the parameter is an engine load factor obtained by dividing the fuel injection amount of the engine by a maximum value of the fuel injection amount of the engine corresponding to the rotation speed of the engine.

* * * * *